(No Model.)
M. CORYELL & F. M. WHEELER.
AIR PUMP.
No. 324,089. Patented Aug. 11, 1885.
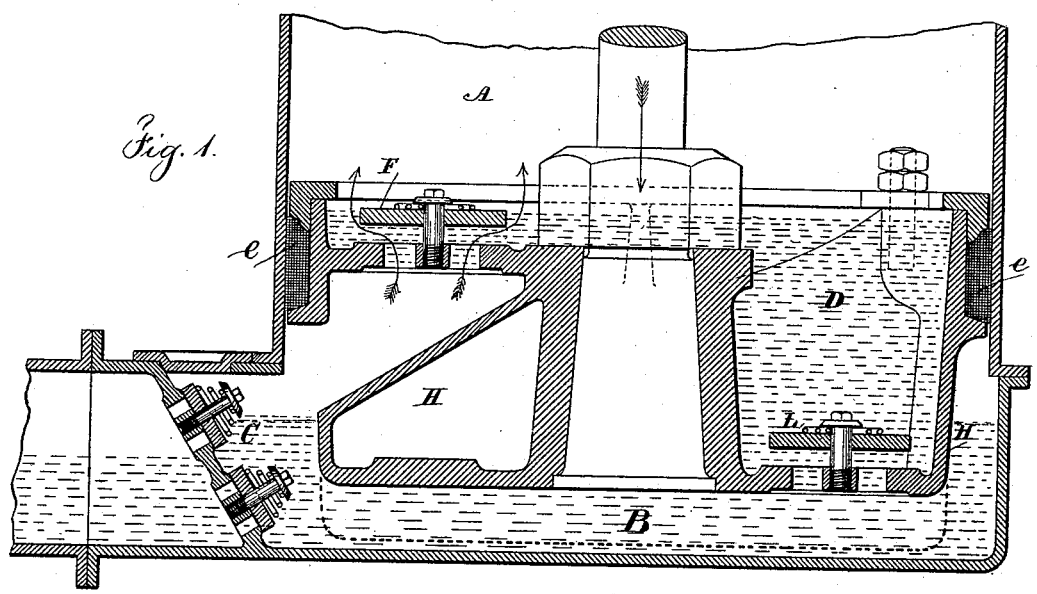
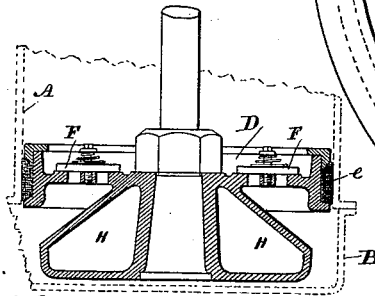
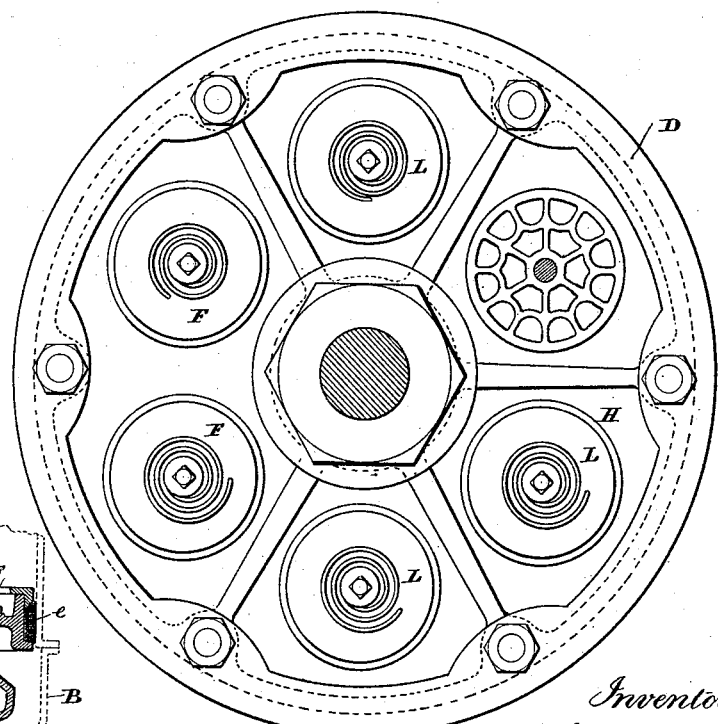
Inventors
Miers Coryell
Fred. M. Wheeler
per Lemuel W. Serrell
atty

United States Patent Office.

MIERS CORYELL, OF NEW YORK, N. Y., AND FREDERICK M. WHEELER, OF MONTCLAIR, NEW JERSEY, ASSIGNORS TO GEORGE F. BLAKE MANUFACTURING COMPANY, OF BOSTON, MASSACHUSETTS.

AIR-PUMP.

SPECIFICATION forming part of Letters Patent No. 324,089, dated August 11, 1885.

Application filed May 26, 1884. (No model.)

*To all whom it may concern:*

Be it known that we, MIERS CORYELL, of the city and State of New York, and FREDERICK M. WHEELER, of Montclair, in the State of New Jersey, have invented an Improvement in Air-Pumps, of which the following is a specification.

Air-pumps have been made with the valves upon the upper surface of the bucket; but the same is not adapted to the removal of the water from the pump-well. To remove the water from the pump-well, the bucket has been made as a basket with the valves in the lower part, but with this form of bucket considerable depth of water remains in the basket; hence the valves have to open against the column of water held in said basket; furthermore, the air cannot be completely removed from the upper part of the pump-well, as the valves are at the bottom of the bucket, the air rises and is not forced through the valve-seats.

Our invention is made for removing the air that is drawn into the pump-well and for displacing the water so that it may be drawn off to a lower level, to prevent the air being obstructed by the water and to allow the air and water to freely pass through the foot-valves into the pump-well.

In the drawings, Figure 1 is a vertical section of the lower part of the air-pump and the bucket. Fig. 2 is a plan view of the bucket, and Fig. 3 is an elevation of a modification in the displacer.

The cylinder A, pump-well B, and foot-valves C are of any desired character. The bucket D is provided with packing at *e*, fitting the inside of the cylinder A, and there are openings through the bucket with seats for the valves F at or near the upper surface of the piston. These valves may be of any suitable character, but usually they are circular with central stems. These valves F are at or near the surface of the bucket, so that but little water will remain above them, and they will open freely by the pressure of the air and vapors confined in the lower part of the pump above the water.

In order to remove the water of condensation from the pump-well, we provide a displacer, H, below the bucket, which, passing down into the water in the well, causes the same to rise and flow through the valve-openings in the bucket. When the bucket is raised, the vacuum action will open the foot-valves and the water and vapors will flow into the pump-well.

The displacer must be smaller than the diameter of the pump, so that the water and air may rise freely around it. There are lateral openings between the displacer and the bucket for the air and water to pass freely to the valve-openings.

In some instances the lateral openings may be all around and above the displacer, and all the valves at the top of the bucket, as seen in Fig. 3. Usually the displacer is made hollow and in one with the bucket, as seen in Figs. 1 and 2, with openings in the bottom covered by the valves L, so that these valves will be opened by the impact upon the water, and by the pressure of the column of water as it rises in the pump-well by the action of the displacer. The air and vapors, however, will pass off through the openings in the upper part of the bucket, followed by the water, the valves F lifting easily, as before described.

We prefer to employ two valves, F, at the surface of the bucket, and four valves, L, at the bottom of the displacer, as shown.

By this improvement we are able to maintain a more perfect vacuum in the condenser than heretofore, especially when the lateral pipe to the condenser is of considerable length.

We are aware that in air-pumps there has been a displacer to pass down into the pump-well; but the valves in this case were at the bottom and acted principally to remove the water, the air and vapors remaining above the water. By our improvement there being valves in the upper surface of the plunger and lateral openings in the displacer to admit the air and vapors, these pass off as the water is raised by the displacer entering the pump-well, and then the water follows through said valves, whether there are any valves in the bottom of the displacer or not.

We claim as our invention—

In an air-pump for the water of condensation, the combination, with the pump-cylinder and the pump-well below such cylinder and the lateral inlet and foot valves, of a piston having a packing within the cylinder, valves above openings in the piston, and a displacer below the piston that passes down into the pump-well, and having lateral openings to allow air and water to escape through the valve-seats in the piston, substantially as specified.

Signed by us this 22d day of May, A. D. 1884.

MIERS CORYELL.
FREDK. M. WHEELER.

Witnesses:
WILLIAM G. MOTT,
HAROLD SERRELL.